(12) United States Patent
Yamamoto

(10) Patent No.: US 11,070,727 B2
(45) Date of Patent: Jul. 20, 2021

(54) IMAGING DEVICE, IMAGING METHOD, AND IMAGING PROGRAM WITH CONTINUOUS INPUT AND PLURALITY OF SETTINGS

(71) Applicant: Sony Corporation, Tokyo (JP)

(72) Inventor: Kouji Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/070,066

(22) PCT Filed: Feb. 8, 2017

(86) PCT No.: PCT/JP2017/004557
§ 371 (c)(1),
(2) Date: Jul. 13, 2018

(87) PCT Pub. No.: WO2017/159127
PCT Pub. Date: Sep. 21, 2017

(65) Prior Publication Data
US 2019/0028644 A1    Jan. 24, 2019

(30) Foreign Application Priority Data

Mar. 16, 2016 (JP) .............................. JP2016-052101

(51) Int. Cl.
*H04N 5/232* (2006.01)
*G03B 17/02* (2021.01)
*H04N 5/225* (2006.01)

(52) U.S. Cl.
CPC ......... *H04N 5/23245* (2013.01); *G03B 17/02* (2013.01); *H04N 5/2251* (2013.01);
(Continued)

(58) Field of Classification Search
CPC ......... H04N 5/23245; H04N 5/232933; H04N 5/23232; H04N 5/23296; H04N 5/2251;
(Continued)

(56) References Cited

U.S. PATENT DOCUMENTS

2004/0061788 A1* 4/2004 Bateman ............ H04N 5/23245
348/220.1
2009/0022488 A1* 1/2009 Kohashi ................ G03B 17/00
396/265
(Continued)

FOREIGN PATENT DOCUMENTS

CN        1856023 A    11/2006
CN     101053253 A    10/2007
(Continued)

OTHER PUBLICATIONS

Chinese Office Action dated Jun. 2, 2020 for corresponding Chinese Application No. 201780015796.X
(Continued)

*Primary Examiner* — Padma Haliyur
(74) *Attorney, Agent, or Firm* — Michael Best & Friedrich LLP

(57) ABSTRACT

An imaging device includes a control unit that performs setting for shooting in accordance with an input from a first input unit is which setting for a still image shooting mode and a plurality of frame rates at the time of moving image shooting can be continuously input.

20 Claims, 10 Drawing Sheets

(52) U.S. Cl.
CPC ........... *H04N 5/2252* (2013.01); *H04N 5/232* (2013.01); *H04N 5/23232* (2013.01); *H04N 5/23293* (2013.01); *H04N 5/23296* (2013.01); *H04N 5/232933* (2018.08)

(58) Field of Classification Search
CPC ... H04N 5/2252; H04N 5/23293; G03B 17/02
See application file for complete search history.

(56) References Cited

U.S. PATENT DOCUMENTS

| | | | |
|---|---|---|---|
| 2009/0189994 | A1 | 7/2009 | Shimonaka |
| 2009/0244306 | A1* | 10/2009 | Saito .................. H04N 1/215 348/220.1 |
| 2016/0142645 | A1* | 5/2016 | Shionoya ........... H04N 5/35554 348/218.1 |
| 2017/0104922 | A1* | 4/2017 | Matsushima ...... H04N 5/23293 |
| 2017/0332019 | A1* | 11/2017 | Ishihara .................. H04N 5/77 |

FOREIGN PATENT DOCUMENTS

| | | | |
|---|---|---|---|
| CN | 102984450 | A | 3/2013 |
| EP | 2003883 | A2 | 12/2008 |
| EP | 2270586 | A1 | 1/2011 |
| JP | 11-215429 | A | 8/1999 |
| JP | 2009-025643 | A | 2/2009 |
| JP | 2015-037289 | A | 2/2015 |

OTHER PUBLICATIONS

Anonymous: "Change the Slow Motion Video Recording Speed on iPhone by Adjusting FPS ", Jan. 8, 2015 (Jan. 8, 2015), XP055545741, Retrieved from the Internet: URL:http://osxdaily.com/2015/01/08/changeslow-motion-video-recording-speed-iphone/ [retrieved on Jan. 22, 2019 ]*the whole document*.

Sena Com et al: "User's Guide Motorcycle Bluetooth? Camera & Communication System", Jul. 10, 2015 (Jul. 10, 2015), XP055294864, Retrieved from the Internet: URL:http://www.sena.com/wp-content/uploads/2015/04/UsersGuide_10C_vI.0.I_en_150710.pdf [retrieved on Aug. 10, 2016]*paragraph [0016]-paragraph [0056]*.

Sagar Bak re: "OnePI us X Review—Performance Reloaded ", Dec. 3, 2015 (Dec. 3, 2015), XP055545781, Retrieved from the Internet: URL:https://www.mobigyaan.com/oneplus-x-review [retrieved on Jan. 22, 2019]*p. 21-p. 24.

Sena Com: "User's Guide PRISM", Dec. 5, 2014, XP055294852, Retrieved from the Internet: URL:http://www.sena.com/wp-content/uploads/2014/12/UsersGuide_Sena_PRISM_v1.O.O.O_en_20141205.pdf\.

Extended European Search Report dated Oct. 21, 2020 for corresponding European Application No. 20188551.4.

* cited by examiner

IMAGING DEVICE, IMAGING METHOD, AND IMAGING PROGRAM WITH CONTINUOUS INPUT AND PLURALITY OF SETTINGS

TECHNICAL FIELD

The present technology relates to an imaging device, an imaging method, and an imaging program.

BACKGROUND ART

In recent years, many cameras have a function to shoot a still image and a moving image. Also, proposed is a camera capable of switching a frame rate at the time of moving image shooting.

In the above-described cameras, "operability" in switching a kind of shooting and a frame rate at the time of moving image shooting is important. Accordingly, proposed is a technology that simplifies switching between moving image shooting and still image shooting (Patent Document 1)

CITATION LIST

Patent Document

Patent Document 1: Japanese Patent Application Laid-Open No. 11-215429 A

SUMMARY OF THE INVENTION

Problems to be Solved by the Invention

However, it can be said that a technology disclosed in Patent Document 1 is inadequate in not supporting change of a frame rate.

The present technology is made in view of the above-described problem, and is directed to providing an imaging device, an imaging method, and an imaging program in which a kind of shooting and a frame rate of moving image shooting can be easily switched.

Solutions to Problems

To solve the above-described problem, a first technology is an imaging device including a control unit adapted to perform setting for shooting in accordance with an input from a first input unit in which setting for a still image shooting mode and a plurality of frame rates at the time of moving image shooting can be continuously input.

Additionally, the second technology is an imaging method including performing setting for shooting in accordance with an input from a first input unit in which setting for a still image shooting mode and a plurality of frame rates at the time of moving image shooting can be continuously input.

Furthermore, a third technology is to provide an imaging program causing a computer to execute an imaging method including performing setting for shooting in accordance with an input from a first input unit in which setting for a still image shooting mode and a plurality of frame rates at the time of moving image shooting can be continuously input.

Effects of the Invention

According to the present technology, it is possible to easily switch a kind of shooting and a frame rate of moving image shooting. Note that the effect recited herein is not necessarily limited and may be any one of those recited in the present specification.

BRIEF DESCRIPTION OF DRAWINGS

FIG. 2A is a front view, FIG. 2B is a rear view, and FIG. 2C is a top view.

FIG. 4A is a front view, FIG. 4B is a rear view, FIG. 4C is a top view, and FIG. 4D is a rear view illustrating another exemplary external configuration.

FIG. 8A is a front view, FIG. 8B is a rear view, FIG. 8C is a top view, and FIG. 8D is a rear view illustrating another exemplary external configuration.

FIG. 9A is a rear view, FIG. 9B is a front view, FIG. 9C is a front view illustrating another external exemplary configuration, and FIG. 9D is a front view illustrating still another exemplary external configuration.

MODE FOR CARRYING OUT THE INVENTION

Figure 1:
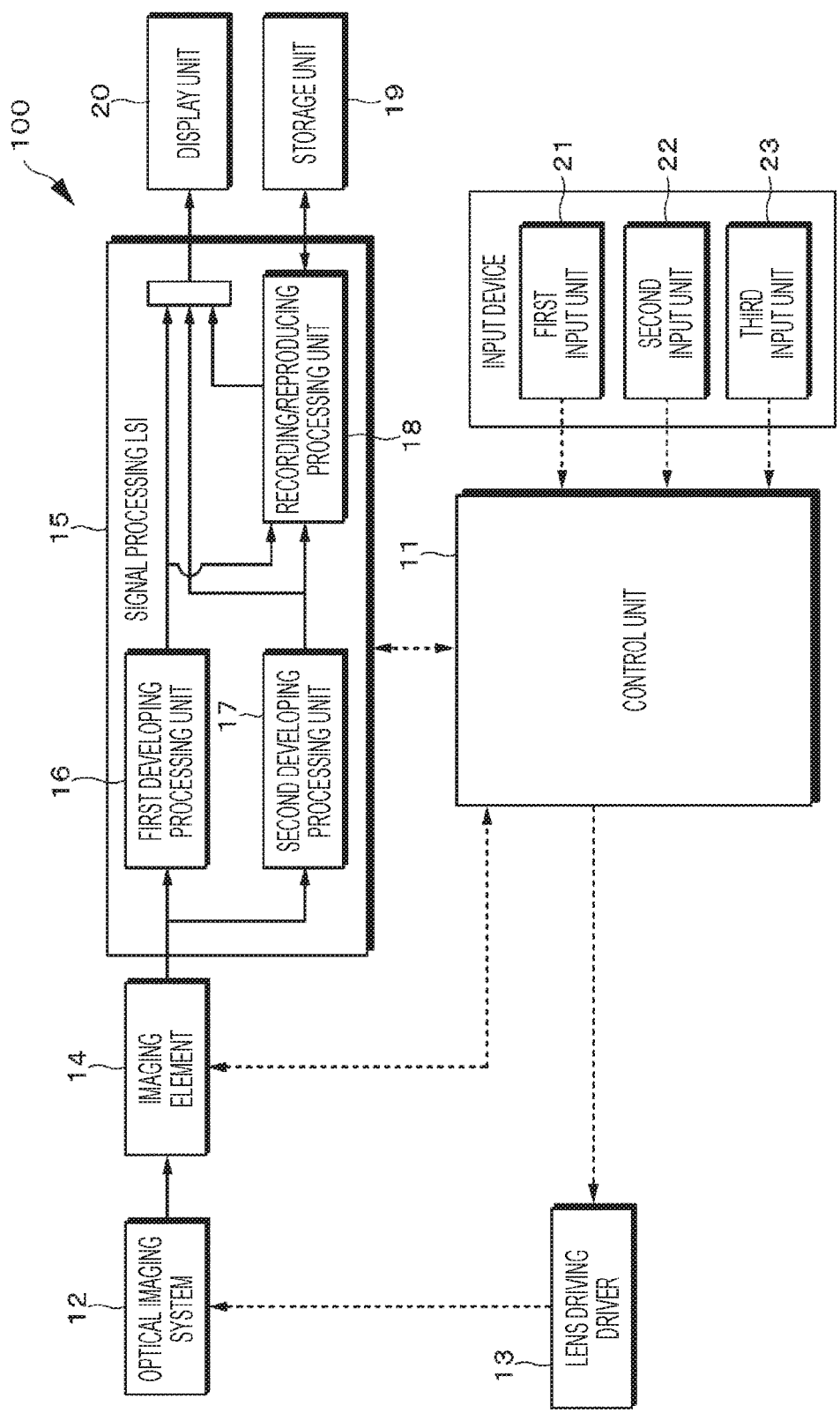
FIG. 1 is a block diagram illustrating a configuration of an imaging device according to the present technology.

In the following, embodiments of the present technology will be described referring to the drawings. Note that the description will be provided in the following order.
<1. First Embodiment>
[1-1. Internal Configuration of Imaging Device]
[1-2. External Configuration of Imaging Device]
[1-3. State Change of imaging Device]
[1-4. Processing in Imaging Device]
<2. Second Embodiment>
[2-1. External Configuration of Imaging Device]
<3. Third Embodiment>
[3-1. External Configuration of Imaging Device]
<4. Modified Examples>

1. First Embodiment

1-1. Internal Configuration of Imaging Device

First, a configuration of the imaging device 100 according to a first embodiment will be described. FIG. 1 is a block diagram illustrating the configuration of the imaging device 100.

The imaging device 100 includes a control unit 11, an optical imaging system 12, a lens driving driver 13, an imaging element 14, a signal processing large-scale integration (LSI) 15, a first developing processing unit 16, a second developing processing unit 17, a recording/reproducing processing unit 18, a storage unit 19, a display unit 20, a first input unit 21, a second input unit 22, and a third input unit 23.

The control unit 11 includes a central processing unit (CPU), a random access memory (RAM), a read only memory (ROM), and the like. The ROM stores, for example, a program to be read and executed by the CPU. The RAM is used as a work memory of the CPU. The CPU executes various kinds of processing in accordance with the program stored in the ROM, and performs control for the entire imaging device 100 by issuing commands. Additionally, the control unit 11 switches a shooting mode between still mage shooting and moving image shooting in accordance with an input from each of the first input unit 21, second input unit 22, and third input unit 23, and performs processing of the present technology such as switching processing for a frame rate of moving image shooting.

The optical imaging system 12 includes: a camera lens to condense light from a subject onto the imaging element 14; a driving mechanism that moves a camera lens to perform focusing and zooming; a shutter mechanism; an iris mechanism; and the like. These components are driven on the basis of a control signal from the control unit 11. An optical image of a subject obtained through the optical imaging system 12 is imaged on the imaging element 14 serving as an imaging device.

The lens driving driver 13 includes, for example, a microcomputer and the like, and performs autofocus so as to focus on a targeted subject by moving the camera lens in an optical axis direction by a predetermined amount under the control of the control unit 11. Additionally, operation of the drive mechanism, shutter mechanism, iris mechanism, and the like of the optical imaging system 12 is controlled under the control of the control unit 11. With this control, adjustment of an exposure time (shutter speed), adjustment of an aperture value (F value), and the like are performed.

The imaging element 14 photoelectrically converts incident light from a subject to convert the incident light into an electric charge amount, and outputs a pixel signal. Then, the imaging element 14 finally outputs an imaging signal including a pixel signal to the signal processing LSI 15. As the imaging element 14, a charge coupled device (CCD), a complementary metal oxide semiconductor (CMOS), or the like is used.

The first developing processing unit 16 generates an image signal after applying, to an imaging signal output from the imaging element 14, sample bold to keep a suitable signal/noise (S/N) ratio by correlated double sampling (CDS) processing, auto gain control (AGC) processing, analog/digital (A/D) conversion, and the like.

Furthermore, the first developing processing unit 16 may apply, to the image signal, predetermined signal processing such as demosaic processing, white balance adjustment processing, color correction processing, gamma correction processing, Y/C conversion processing, auto exposure (AE) processing, and resolution conversion processing.

The second developing processing unit 17 performs processing similar to that of the first developing processing unit 16. Meanwhile, in the present embodiment illustrated in FIG. 1, the imaging device 100 includes two developing processing units including the first developing processing unit 16 and the second developing processing unit 17, but the number of developing processing units is not limited to two, and may also be the number equal to the number of necessary streams.

The recording/reproducing processing unit 18 applies, to still mage data and moving image data subjected to the predetermined processing, encoding processing and decoding processing for recording and communication, for example. The still image data and moving image data subjected to the processing are saved in the storage unit 19 and displayed on the display unit 20.

The storage unit 19 is, for example, a large-capacity storage medium such as a hard disk or an SD memory card. An image is saved in a compressed state on the basis of a standard such as a joint photographic experts group (JPEG), for example. Additionally, exchangeable image file format (EXIF) data including information regarding a stored image and additional information such as a date and time of shooting is also saved in a manner correlated to the image. A moving image is saved in a format such as a moving picture experts group 2 (MPEG2) or MPEG4, for example.

The display unit 20 is a display device including, for example, a liquid crystal display (LCD), a plasma display panel (PDP), an organic electro luminescence (EL) panel, or the like. On the display unit 20, a user interface, a menu screen, a monitoring image currently being imaged, a shot image and a shot moving image which are recorded in the storage unit 19, and the like of the imaging device 100 are displayed.

The first input unit 21, second input unit 22, and third input unit 23 are provided in order to: switch a shooting mode between a still image shooting mode and a moving image shooting mode; switch a frame rate of moving image shooting; provide a shooting command; provide a continuous shooting command; and the like according to the present technology. When an input is made to each of the first input unit 21, second input unit 22, and third input unit 23, a control signal corresponding to the input is generated and output to the control unit 11. Then, the control unit 11 performs calculation processing and control for the imaging device 100 in accordance with the control signal. Detailed configurations of the first input unit 21, second input unit 22, and third input unit 23 will be described later.

Additionally, the imaging device 100 includes various kinds of input devices for shooting performed by the imaging device 100, such as a power button to switch on/off power and a handler to perform zoom adjustment, for example.

1-2. External Configuration of Imaging Device

Figure 2:
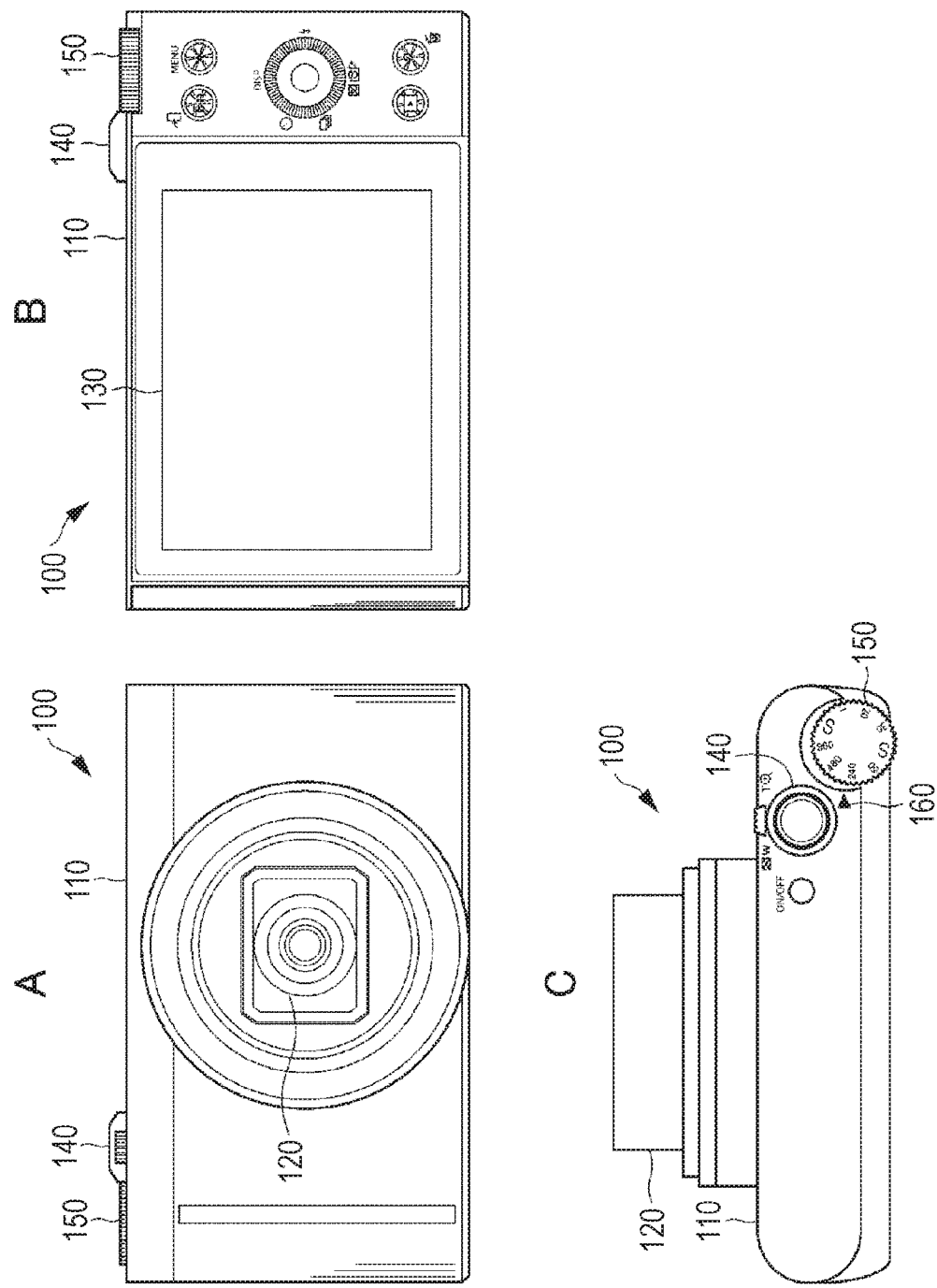
FIG. 2 provides views illustrating an external configuration of an imaging device according to a first embodiment.
Figure 3:
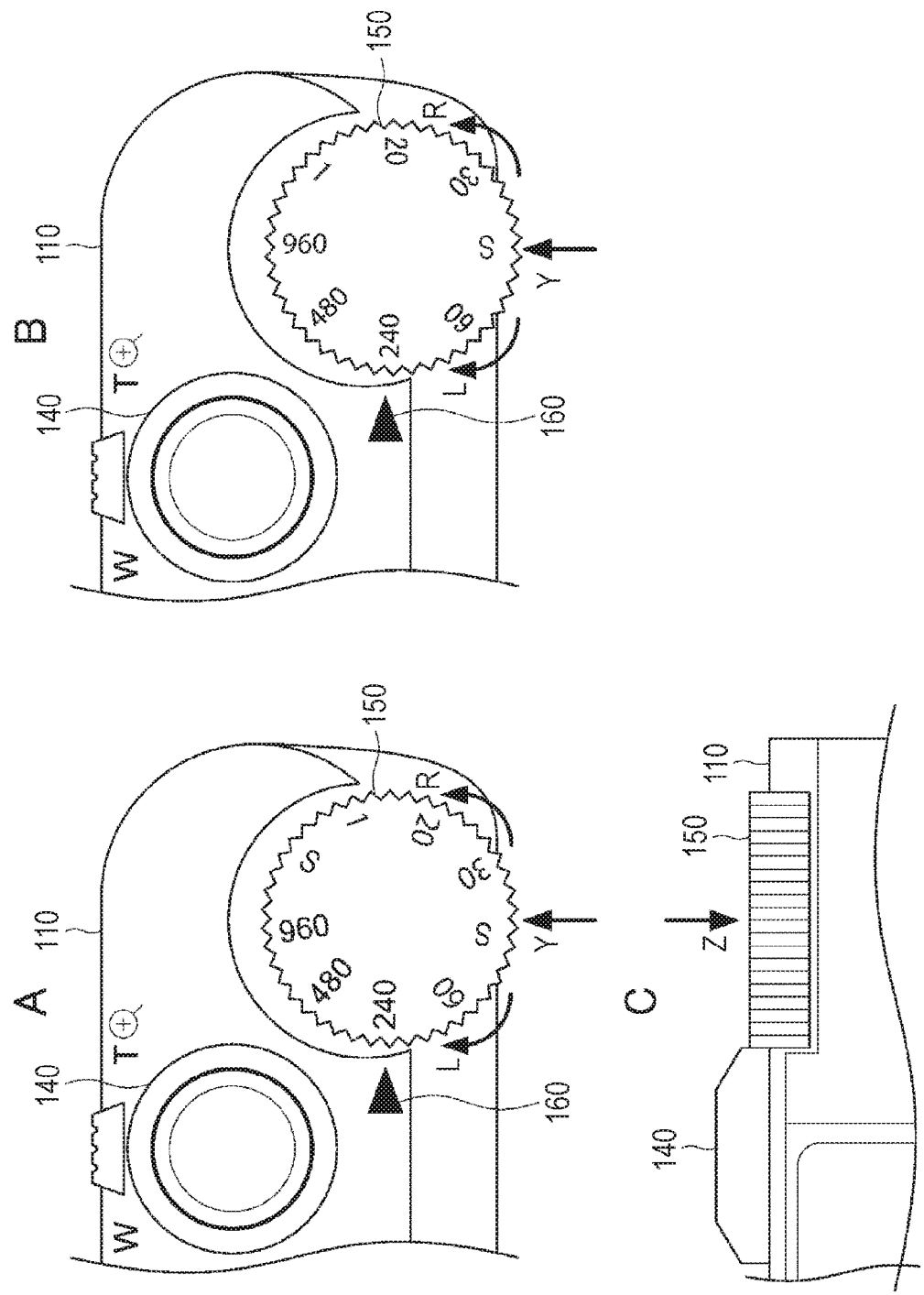
FIG. 3A is an enlarged partial top view of the imaging device illustrating a configuration of an input device.
FIG. 3B is an enlarged partial top view illustrating another example of the configuration of the input device.
FIG. 3C is an enlarged partial side view illustrating the configuration of the input device.
Figure 4:
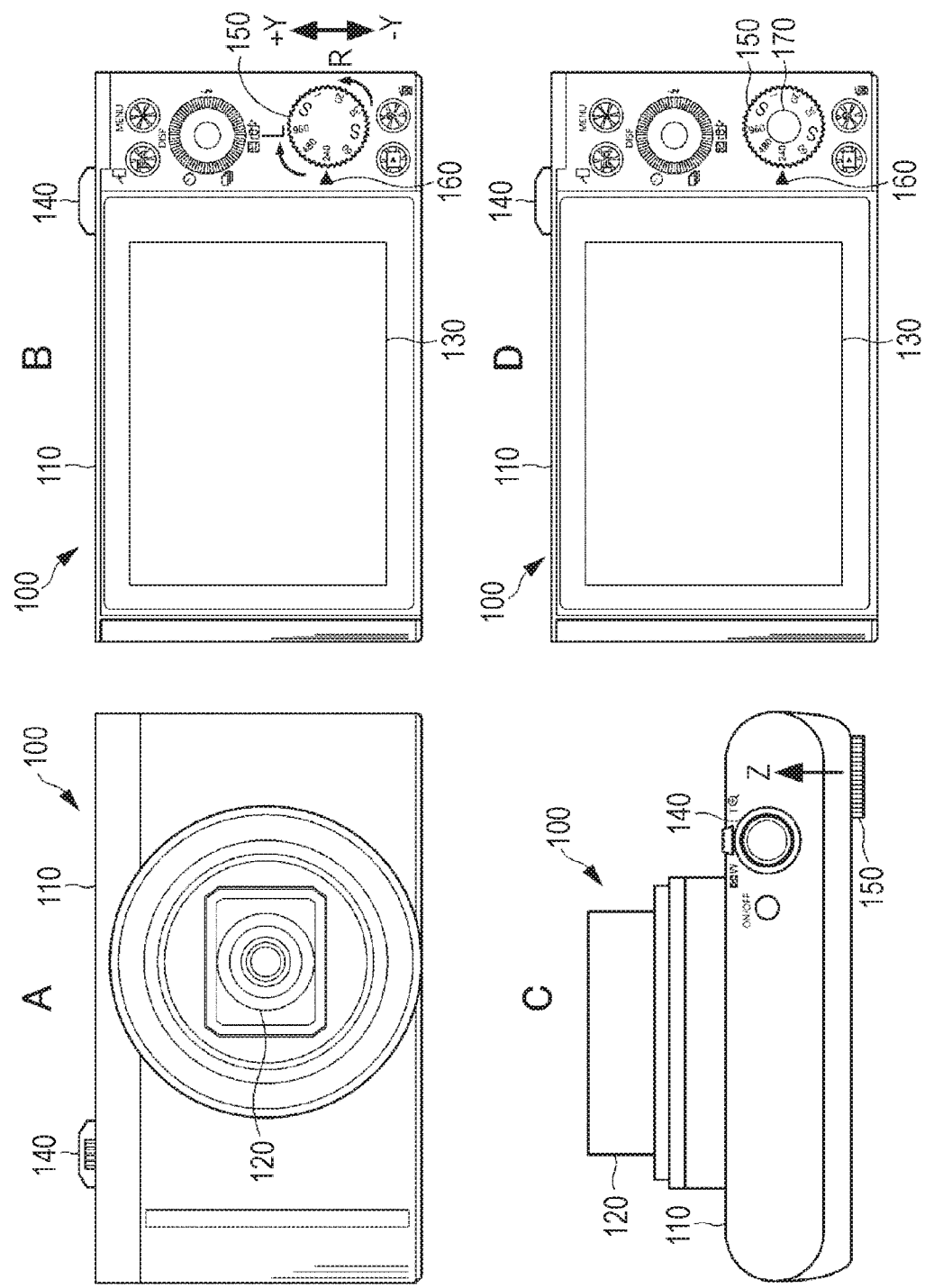
FIG. 4 provides views illustrating a second exemplary external configuration of the imaging device according to the first embodiment.

Next, an external configuration of the imaging device 100 according to the first embodiment will be described with reference to FIGS. 2 to 4. The imaging device 100 has a configuration having a substantially rectangular parallelepiped shape that is flat and horizontally long.

A camera lens 120 is provided on a front surface of a housing 110 of the imaging device 100. A user performs shooting by orienting the camera lens 120 toward a subject.

A monitor 130 is provided on a rear surface of the imaging device 100. The monitor 130 corresponds to the display unit 20 in the block diagram of FIG. 1 and is a display means including an LCD, a PDP, an organic EL panel, or the like. The monitor 130 displays a through image, a still image and a moving image which are obtained from shooting, user interface, and the like. The monitor 130 may be formed as a touch screen integrated with a touch panel. In a case where the monitor 130 is the touch screen, a user can make various kinds of inputs to the imaging device 100 by touching the screen with a finger.

A shutter button 140 is provided on an upper surface of the imaging device 100. A user can perform, by pressing the shutter button 140, focusing by autofocus, providing a command to shoot a still image, and providing a command to shoot a moving image. Meanwhile, as described below, the imaging device 100 does not necessarily include the shutter button 140 because an input device 150 has a function as a shutter button.

The input device 150 is provided on the upper surface of the imaging device 100. In the first embodiment, the input device 150 has a dial-like shape. The input device 150 has a continuous corrugated side surface in the top view, and has a configuration rotatable in an L direction and an R direction while setting a center thereof in the top view as a rotation axis as illustrated in FIG. 3A. Additionally, the input device 150 has an upper surface on which character "S" indicating a still image shooting mode, and seven numerical values indicating frame rates of moving image shooting are printed. The "S" and the numerical value indicating the frame rates may be provided by printing the same on the upper surface of the input device 150, or may also be displayed as an image on a display by structuring the upper surface of the input device 150 as the display.

An arrow icon 160 serving as a mark to point at a current shooting mode or a current frame rate is provided on the upper surface of the imaging device 100. A user can select a shooting mode or a frame rate by rotating the input device 150 and adjusting the character/numerical value of a desired shooting mode or a desired frame rate to the position pointed by the arrow icon 160. In a case of selecting the character "S", the imaging device 100 is operated in the still image shooting mode. Additionally, in a case of selecting a numerical value indicating a frame rate, the shooting mode of the imaging device 100 becomes the moving image shooting mode, and starts shooting a moving image at the selected frame rate. Such an input to rotate the dial-like input device 150 in the L direction or the R direction corresponds to the first input unit 21. Note that the arrow icon 160 may have a shape other than the arrow.

In the present embodiment, frame rates of moving image shooting include 1 frames per second (fps), 20 fps, 30 fps, 60 cps, 240 fps, 480 fps, and 960 fps. When the input device 150 is rotated in the L direction in the plan view, a frame rate becomes high (becomes slow motion), and when rotated in the R direction, a frame rate becomes low (fast-forwarding). Note that the values of the frame rates are merely examples and not limited to the above values.

Additionally, in the present embodiment, two characters of "S" indicating the still image shooting mode are arranged next to 1 fps and next to 60 fps, respectively. With this arrangement, the moving image shooting mode can be easily changed to the still image shooting mode because a moving distance from any of frame rates to the "S" is shorter than in the case of arranging only one "S".

In general, 60 fps is a frame rate that is generally assumed to be able to reproduce a smooth image and used in shooting a normal moving image. Therefore, since the "S" is arranged next to 60 fps, switch between moving image shooting at the frame rate of 60 fps and still image shooting can be quickly and easily performed, and this 60 fps is the frame rate used with high frequency.

However, as illustrated in FIG. 3B, the number of "S" indicating the still image shooting mode may be one. In a case of having only one "S", it is preferable to arrange the "S" next to 1 fps that is a minimum frame rate, for example. With this arrangement, it is possible to seamlessly and continuously switch the frame rate from the minimum value to a maximum value without interposing still image shooting. Note that the number of the "S" is not limited to one or two, but may be three or more.

Meanwhile, the input device 150 may have a configuration in which rotational movement to a next frame rate from 60 fps and from the "S" indicating the still image shooting mode is hardly rotated. With this configuration, it is possible to prevent erroneous operation in which the input device 150 is accidentally and unintentionally rotated to a non-desired frame rate from the still image shooting or from the moving image shooting at the frame rate of 60 fps assumed to be used with high frequency. Such a configuration can be implemented by, for example, providing a claw or the like serving as a hook on a rotation mechanism of the input device 150.

Furthermore, the input device 150 has a configuration slidable in a direction of an arrow Y in FIG. 3A when pressed by a user. When a user lifts up the finger and the force to slide the input device 150 in the Y direction is released, the input device 150 returns to an initial position. With this configuration, the input device 150 has an integrated configuration functioning as not only a dial but also as a button.

Sliding in the Y direction of the input device 150 can be performed by two-step inputs including half pressing and deep pressing. This is similar to half pressing and deep pressing of a release button included in a general imaging device. Sliding operation in the Y direction of the input device 150 including half pressing and deep pressing corresponds to the second input unit 22.

In the present embodiment, a focusing command can be input by half pressing of the second input unit 22. Additionally, a command for image acquisition (still image shooting) and moving image acquisition (moving image shooting) can be input by deep pressing of the second input unit 22.

Furthermore, as illustrated in FIG. 3C, the input device 150 has a configuration that can be pressed in a Z direction when pressed by a user. When the user lifts up the finger to release the force to press the input device 150 in the Z direction, the input device 150 returns to the initial position. Such operation in the Z direction corresponds to the third input unit 23. A command for image acquisition (still image shooting) can be input by an input to the third input unit 23. With this configuration, the input device has an integrated configuration functioning not only as the dial serving as the first input unit 21 and the button in the Y direction serving as the second input unit 22 but also as the button in the Z direction serving as the third input unit 23.

The first input unit 21 of the input device 150 corresponds to rotation in the L direction and the R direction in the plan view, and the second input unit 22 corresponds to the button in the Y direction. Furthermore, since the third input unit 23 corresponds to the button in the Z direction, all kinds of input operation are performed in different directions. A user can perform, with one finger (e.g., thumb), any one of an input to the first input unit 21, an input to the second input unit 22, and an input to the third input unit 23. With this configuration, it is possible to smoothly perform, without lifting up the finger from the input device 150 and also without changing a holding way of the imaging device 100, a series of flow from selecting a shooting mode and a frame rate of moving image shooting by the input to the first input unit 21 to providing a shooting command by the second input unit 22 or the third input unit 23.

Note that a position of the input device 150 is not limited to the upper surface of the imaging device 100. As illustrated in FIG. 4, the input device 150 may also be provided on the rear surface of the imaging device 100.

In the case of providing the input device 150 on the rear surface of the imaging device 100, the arrow icon 160 serving as the mark to point at a current shooting mode or a current frame rate is also provided on the rear surface as illustrated in FIG. 4B. The input device 150 has a configuration rotatable in the direction and the R direction while setting the center thereof as the rotation axis, and a shooting mode or a frame rate can be selected by adjusting a desired shooting mode and a desired frame rate of moving image shooting to the position pointed by the arrow icon 160.

In the case of providing the input device 150 on the rear surface of the imaging device 100, the input device 150 has the configuration that can be pressed in a direction of an arrow Z (depth direction: housing side direction) in FIG. 4C when pressed by a user. When the user lifts up the finger to release the force to press the input device 150 in the Z direction, the input device 150 returns to the initial position. With this configuration, the input device 150 has an integrated configuration functioning as not only a dial but also as a button.

Pressing in the Z direction of the input device 150 can be performed by two-step inputs including half pressing and deep pressing. This is similar to half pressing and deep pressing of a release button included in a general imaging device. Pressing in the Z direction of the input device 150 including half pressing and deep pressing corresponds to the second input unit 22.

In the present embodiment, a command for focusing can be input by half pressing of the second input unit 22, and a command for image acquisition (still image shooting) and moving image acquisition (moving image shooting) can be input by deep pressing of the second input unit 22.

Additionally, as illustrated in FIG. 4B, the input device 150 may be provided in a manner slidable in a direction of an arrow +Y. When a user lifts up the finger to release force to slide the input device 150 in the +Y direction, the input device 150 returns to the initial position. Such operation in the +Y direction corresponds to the third input unit 23. A command for image acquisition (still image shooting) can be input by an input to the third input unit 23.

With this configuration, the input device 150 has an integrated configuration functioning not only as the dial serving as the first input unit 21 and the button in the Z direction serving as the second input unit 22 but also as the button in the −Y direction serving as the third input unit 23. All of these inputs, all kinds of input operation are performed in different directions. Note that the third input unit 23 may also be a button in a −Y direction illustrated in FIG. 4B.

Furthermore, as illustrated in FIG. 4D, it may be possible to provide a separate input device 170 by forming a substantially center portion of the input device 150 separately from the input device 150 in the rear surface view, and the separate input device has a button-like shape and can be pressed in the Z direction. The separate input device 170 has a configuration that returns to the initial position when a user lifts up a finger to release force to press the separate input device 170 in the Z direction. Such an input to the separate input device 170 corresponds to the third input unit 23. By thus providing the separate input device 170, the imaging device 100 also includes not only the dial serving as the first input unit 21 of the input device 150 and the button in the Z direction serving as the second input unit 22 but also the button in the Z direction serving as the third input unit 23.

Since the first input unit 21 is to perform rotation in the L direction/R direction in the rear view, the second input unit 22 is to perform pressing in the Z direction, the third input unit 23 is to perform sliding in the Y direction, or the separate input device 170 is to perform pressing, a user can perform all kinds of inputs to the first input unit 21, second input unit 22, and third input unit 23 with one finger (e.g., thumb). Consequently, it is possible to smoothly perform, without lifting up a finger from the input device and without changing a holding way of the imaging device 100, a series of flow from selecting a shooting mode or a moving image frame rate by the input to the first input unit 21 to providing a shooting command by the second input unit 22 or the third input unit 23.

1-3. State Change of Imaging Device

Next, state change of the imaging device 100 will be described with reference to FIGS. 5 and 6. State change control for the imaging device 100 is performed by the control unit 11. Note that that, in FIG. 5, monitors 130 illustrated in a state change diagram represent display styles of the monitor 130 in a still image shooting standby state and a moving image shooting standby state.

The still image shooting standby state is a state in which: the imaging device 100 is in the still image shooting mode; a monitoring image (through image) is displayed on the monitor 130 serving as the display unit 20; and a still image can be shot by deeply pressing the second input unit 22. Additionally, the moving image shooting standby state is a state in which: the imaging device 100 is in the moving image shooting mode; a monitoring image (through image) is displayed on the monitor 130 serving as the display unit 20; and a moving image can be shot by deeply pressing the second input unit 22.

Figure 5:
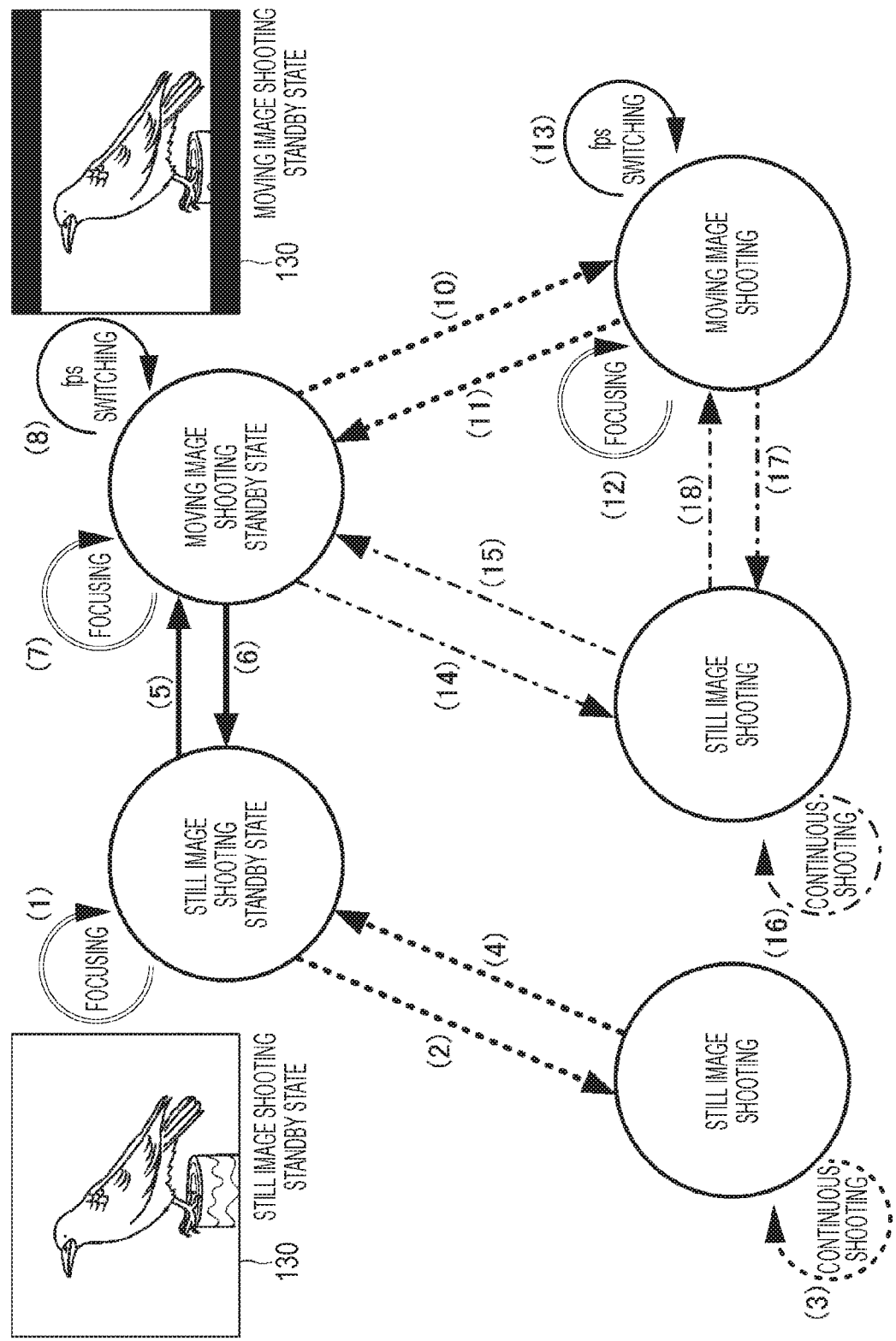
FIG. 5 is a diagram illustrating first exemplary state changes of the imaging device.

In FIG. 5, a solid line indicates an input to the first input unit 21, a double line indicates an input to the second input unit 22, a broken line indicates an input to the second input unit 22, and an alternate long and short dash line indicates an input to the third input unit 23.

First, when a half-pressing input is made to the second input unit 22 in a case where the imaging device 100 is in the still image shooting mode and in the still image shooting standby state, focusing is performed (arrow (1)).

When a deep-pressing input is made to the second input unit 22 in the still image shooting standby state in either case of before and after focusing is performed, a still image is acquired (arrow (2)). Additionally, when deep pressing is continued at the time of acquiring a still image by making a deep-pressing input to the second input unit 22, continuous shooting of still images is performed while such deep pressing is continued (arrow (3)). When the deep pressing to the second input unit 22 is released, the imaging device 100 is changed to the still image shooting standby state (arrow (4)).

When an input to select a frame rate of moving image shooting is made to the first input unit 21 in a case where the imaging device 100 is in the still image shooting mode, the imaging device 100 is changed to the moving image shooting mode and becomes the moving image shooting standby state (arrow (5)).

Additionally, when an input to select the still image shooting is made to the first input unit 21 in a case of the moving image shooting mode, the imaging device 100 is changed to the still image shooting mode and becomes the still image shooting standby state (arrow (6)). When the mode is changed from the still image shooting mode to the moving image shooting mode, a display of a monitoring image on the monitor 130 is switched from a ratio of horizontal 4:vertical 3 to a ratio of horizontal 16:vertical 9, for example, as illustrated in the monitor 130 as illustrated in FIG. 5. Additionally, when the mode is changed from the moving image shooting mode to the still image shooting mode, the display of the monitoring image on the monitor 130 is switched from the ratio of horizontal 16:vertical 9 to the ratio of horizontal 4:vertical 3. With this display change, a user can easily visually recognize that the shooting mode is switched. Note that the ratio of horizontal 4:vertical 3 and the ratio of horizontal 16:vertical 9 are merely examples, and other ratios may be also applicable.

In the moving image shooting standby state, focusing is performed when half-pressing input is made to the second input unit 22 (arrow (7)). Additionally, when an input to switch a frame rate is made to the first input, unit 21 in the moving image shooting standby state, the frame rate of moving image shooting is switched to a designated value (arrow (8)).

When a deep-pressing input is made to the second input unit 22 in the moving image shooting standby state in either case of before and after focusing is performed in the moving image shooting standby state, moving image shooting is started (arrow (10)). Additionally, when a deep-pressing input is made to the second input unit 22 during moving image shooting, the imaging device 100 stops moving image shooting and is changed to the moving image shooting standby state (arrow (11)).

When a half-pressing input is made to the second input unit 22 during moving image shooting, focusing is performed (arrow (12)). Furthermore, when an input to switch a frame rate is made to the first input unit 21 during moving image shooting, the frame rate of the moving image shooting is switched to a designated value (arrow (13)).

When an input is made to the third input unit 23 in the moving image shooting standby state, a still image is acquired (arrow (14)). When still image shooting is completed, the imaging device 100 returns to the moving image shooting standby state (arrow (15)). By thus using the third input unit 23, still image shooting can be performed also in the moving image shooting standby state. Meanwhile, when an input is continuously made to the third input unit 23 in a case where still image shooting is performed by the input to the third input unit 23, continuous shooting of still images is performed while deep pressing is continued (arrow (16)).

Additionally, when an input is made to the third input unit 23 during moving image shooting, a still image is acquired (arrow (17)). When still image shooting is completed, the imaging device 100 returns to the moving image shooting state (arrow (18)) and restarts moving image shooting. By thus using the third input unit 23, still image shooting can be performed also during moving image shooting. Meanwhile, when an input is continuously made to the third input unit 23 in a case where still image shooting is performed by the input to the third input unit 23, continuous shooting of still images is performed while deep pressing is continued (arrow (16)).

Thus, the state of the imaging device 100 is changed.

The above-described state change of the imaging device 100 is an example in which the still image shooting standby state and the moving image shooting standby state are distinguished from each other in the still image shooting mode and the moving image shooting mode, and monitoring images are differently displayed on the monitor 130. However, the still image shooting standby state and the moving image shooting standby state may not be necessarily distinguished from each other in the still image shooting mode and the moving image shooting mode.

Next, state change of the imaging device 100 in a case where the still image shooting standby state and the moving image shooting standby state are not distinguished from each other will be described with reference to FIG. 6. A fact that the still image shooting standby state and the moving image shooting standby state are not distinguished from each other is a fact that there is no display change on the monitor 130 between the still image shooting standby state and the moving image shooting standby state.

First, in a case where the imaging device 100 is in the still image shooting standby state and also in the moving image shooting standby state (hereinafter referred to as a still image/moving image shooting standby state), focusing is performed when a half-pressing input is made to the second input unit 22 (arrow (21)). Additionally, when an input to switch a frame rate is made to the first input unit 21, a frame rate of moving image shooting is switched (arrow (22)). Note that there is no display change on the monitor 130 in both of cases where the imaging device 100 is in the still image shooting mode and in the moving image shooting mode.

Also, when a deep-pressing input is made to the second input unit 22 in the still image shooting mode in either case of before and after focusing is performed, a still image is acquired (arrow (23)). Additionally, when deep pressing is continued at the time of acquiring a still image by making a deep-pressing input to the second input unit 22, continuous shooting of still images is performed while the deep pressing is continued (arrow (24)). When a user releases deep pressing to the second input unit 22, the imaging device 100 is changed to the still image/moving image shooting standby state (arrow (25)).

On the other hand, when a deep-pressing input is made to the second input unit 22 in the moving image shooting mode, moving image shooting is started (arrow (26)). Then, when a deep-pressing input is made to the second input unit 22 during moving image shooting, the imaging device 100 stops moving image shooting and is changed to the still image/moving image shooting standby state (arrow (27)).

When a half-pressing input is made to the second input unit 22 during moving image shooting, focusing is performed (arrow (28)). Furthermore, when an input to switch a frame rate is made to the first input unit 21 during moving image shooting, the frame rate of the moving image shooting is switched to a designated value (arrow (29)).

When an input is made to the third input unit 23 during moving image shooting, a still image is acquired even during moving image shooting (arrow (30)). Additionally, when still image shooting is completed, the imaging device 100 returns to moving image shooting (arrow (31)). By thus using the third input unit 23, still image shooting can be performed also during moving image shooting. Meanwhile, when an input is continuously made to the third input unit 23 in a case where still image shooting is performed by the input to the third input unit 23, continuous shooting of still images is performed while deep pressing is continued (arrow (32)).

Figure 6:
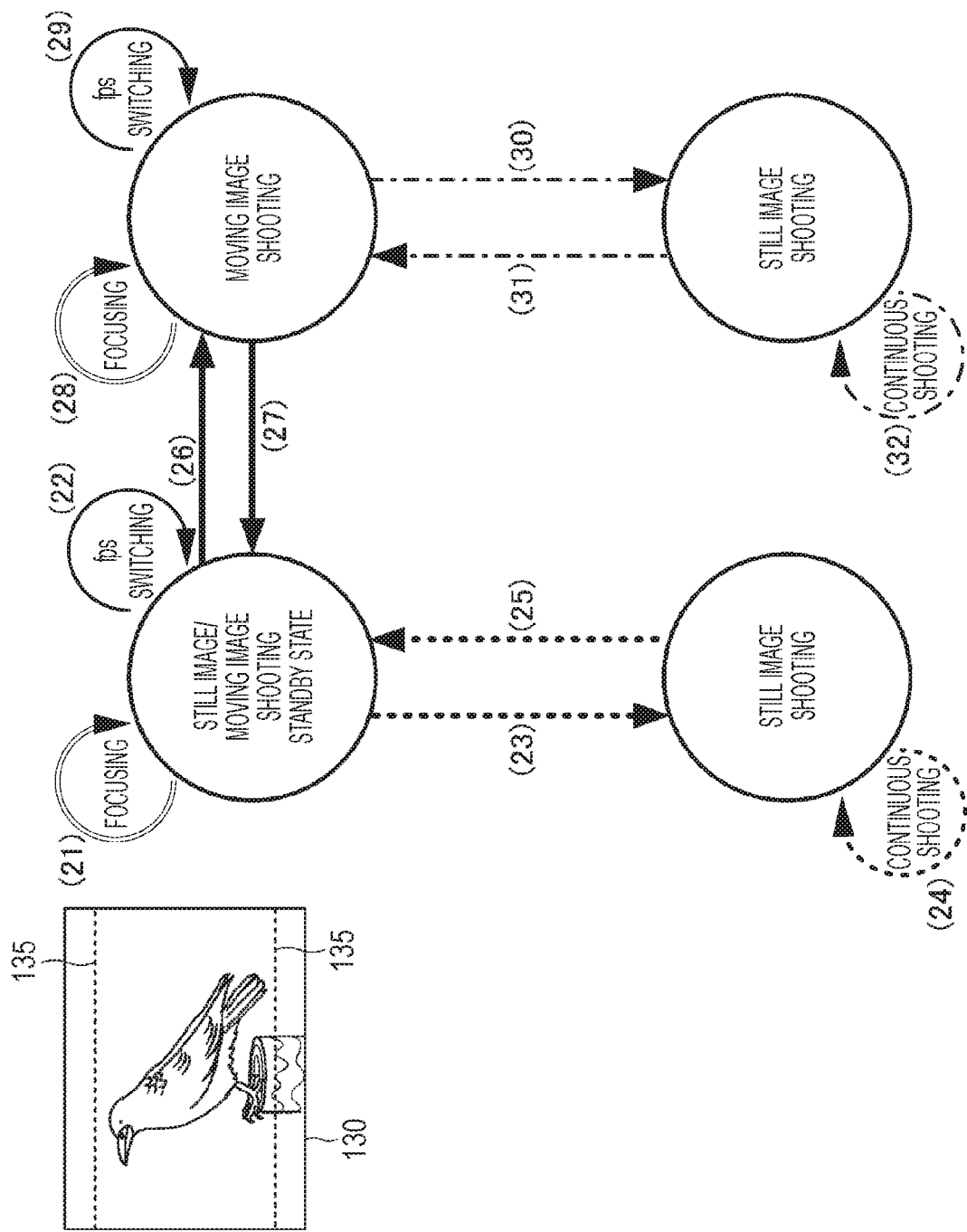
FIG. 6 is a diagram illustrating second exemplary state changes of the imaging device.

Incidentally, like the monitor 130 illustrated in FIG. 6, a frame 135 indicating a shooting range of moving image shooting may be displayed on the monitor 130 during the moving image shooting standby state and moving image shooting.

The state of the imaging device 100 is changed as described above in the case where the standby states in the still image shooting mode and the moving image shooting mode are not distinguished from each other.

Additionally, in a case where an input to switch the mode to the still image shooting mode is made to the first input unit 21 during moving image shooting, the moving image shooting may be finished, or the mode may not be changed to the still image shooting mode by invalidating the input.

1-4. Processing in Imaging Device

Figure 7:
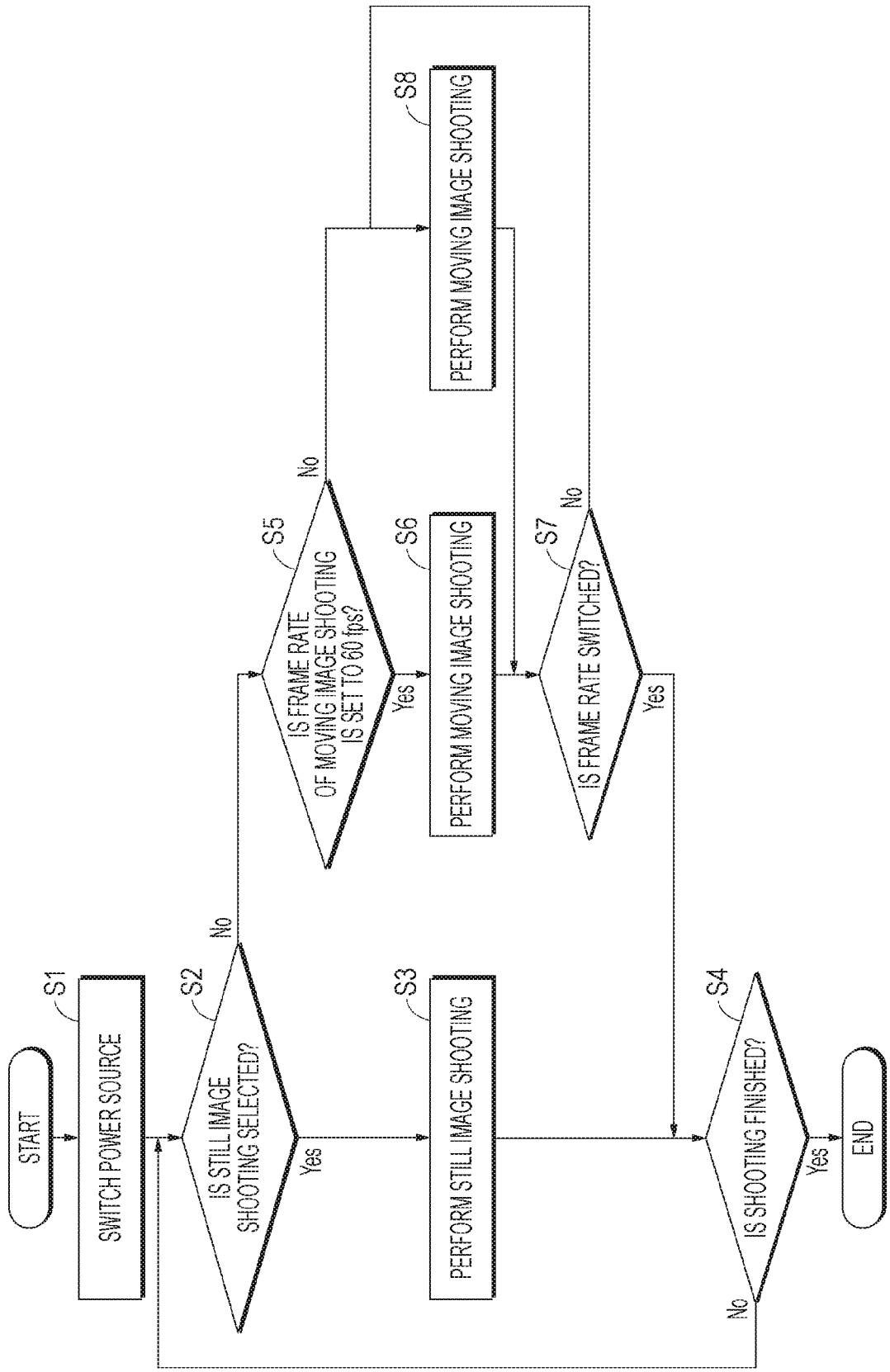
FIG. 7 is a flowchart illustrating a flow of processing by a control unit.

Next, control processing for an input from a user by the control unit 11 will be described. FIG. 7 is a flowchart illustrating a flow of the control processing.

First, in step S1, a power source of the imaging device 100 is turned on. This is performed in accordance with an input from a user to a power button, for example. Next, in step S2, determination is made on whether still image shooting mode is selected by an input to the first input unit 21. In a case where the still image shooting mode is selected, the processing proceeds to step S3 (Yes in step S2).

Next, in step S3, the imaging device 100 becomes the still image shooting mode, and still image shooting processing is performed in accordance with an input from the user. In this still image shooting processing, focusing is performed in a case where half pressing is made to the second input unit 22, and an image is acquired by shooting in a case where deep pressing is made to the second input unit 22. Additionally, in a case where deep pressing to the second input unit 22 is continued for a predetermined time, continuous shooting is performed.

Next, in step S4, determination is made on whether shooting is finished. For example, in a case where there is no input to the first input unit 21 or the second input unit 22 for a predetermined time, it can be determined that shooting is finished. In the case where shooting is finished, the processing ends (Yes in step S4).

Meanwhile, in the case where shooting is finished, in a case where the imaging device 100 is in the moving image shooting mode, the shooting mode may be changed to the still image shooting mode by rotating the input device 150 such that the "S" of the first input unit 21 automatically aligned with the position pointed by the arrow icon 160. Additionally, in a case where a shooting mode and a frame rate of the first input unit 21 are displayed on a monitor provided on the upper surface of the input device 150, the shooting mode is changed to the still image shooting mode by the processing of the control unit 11, and the position of "S" of the first input unit 21 may be aligned with the position of the arrow icon 160 by changing the display without rotating the input device 150. Meanwhile, the state of the input device 150 may also be kept in a state same as when shooting is finished.

The description returns to step S2. In a case where it is not determined in step S2 that the still image shooting mode is selected, the processing proceeds to step S5 (No in step S2). Then, in step determination is made on whether the moving image shooting mode at a frame rate of 60 fps is selected. Meanwhile, the reason for setting here the frame rate to 60 fps is that 60 fps is a frame rate that is generally assumed to be able to reproduce a smooth image and used in shooting a normal moving image. Therefore, this processing may be performed at a specific frame rate not limited to 60 fps.

In a case where it is determined in step S5 that 60 fps is selected as the frame rate, the processing proceeds to step S6 (Yes in step S5). Next, in step S6, the imaging device 100 becomes the moving image shooting mode, and moving image shooting processing is performed. In this moving image shooting processing, focusing is performed in a case where half pressing is made to the second input unit 22, and moving image shooting is started in a case where deep pressing is made to the second input unit 22. Additionally, in a case where deep pressing is made to the second input unit 22 during moving image shooting, moving image shooting is finished. Furthermore, focusing is also performed in a case where half pressing is made to the second input unit 22 during moving image shooting. Additionally, in a case where an input is made to the third input unit 23, still image shooting is performed even during moving image shooting.

Next, in step S7, determination is made on whether an input to switch a frame rate is made to the first input unit 21. In a case of not switching the frame rate, in other words, in a case where there is no input made to the first input unit 21, the processing proceeds to step S4 (No in step S7). Then, in step S4, in a case where determination is made on whether shooting is finished and it is determined that shooting is finished, the processing ends (Yes in step S4).

On the other hand, in a case where it is determined in step S7 that an input to switch the frame rate is made, the processing proceeds to step S8 (No in step S7). Additionally, in a case where the moving image shooting mode at the frame rate of 60 fps is not selected in step S5, in other words, in a case where another frame rate is selected, the processing also proceeds to step S8 (No in step S5).

A fact that the processing has reached step S8 corresponds to a fact that a frame rate other than 60 fps is selected. Therefore, in step S8, moving image shooting processing is performed at the selected frame rate other than 60 fps. The moving image shooting processing is similar to that in step S6 described above.

Then, in step S8, determination is made on whether an input to switch the frame rate is made to the first input unit 21. In a case of not switching the frame rate, in other words, in a case where no input is made to the first input unit 21, the processing proceeds to step S4 (No in step S8). Then, in a case where determination is made on whether shooting is finished in step S4 and it is determined that the shooting is finished, the processing ends (Yes in step S7).

In a case where it is determined in step S4 that the shooting is not finished yet, for example, in a case where there is an input to the first input unit 21 or the second input unit 22 within a predetermined time period, the processing proceeds to step S2, deeming that shooting is still continued (No in step S4).

As described above, the control processing in accordance with an input from a user is performed.

As described above, according to the first embodiment, it is possible to easily switch a shooting mode and a frame rate of moving image shooting by a seamless continuous input, and also it is also possible to easily perform a series of shooting operation from switching a shooting mode and a frame rate of moving image shooting to acquiring a still image and acquiring a moving image.

2. Second Embodiment

2-1. External Configuration of Imaging Device

Figure 8:
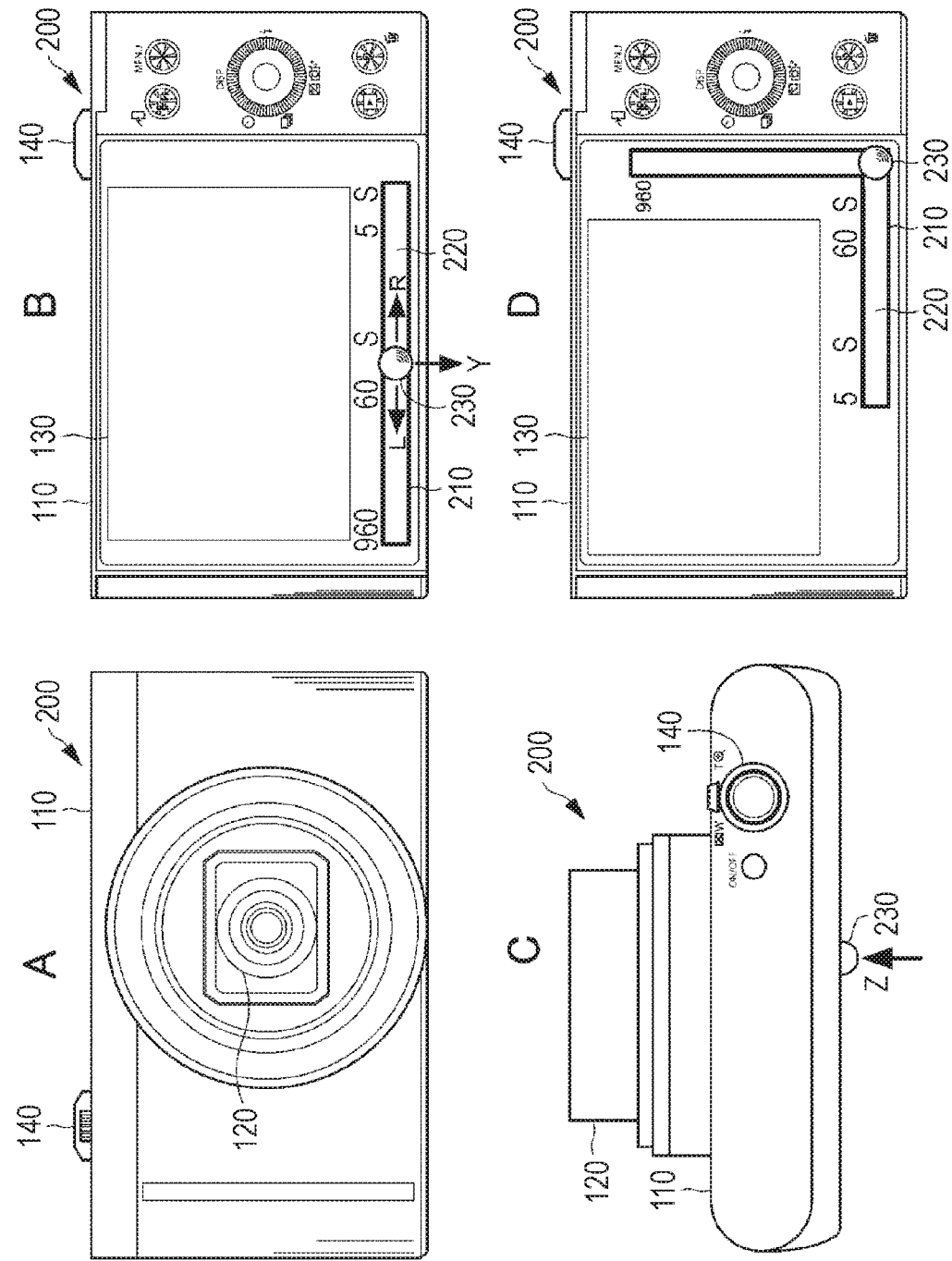
FIG. 8 provides views illustrating an external configuration of an imaging device according to a second embodiment.

Next, an external configuration of the imaging device 200 according to a second embodiment will be described with reference to FIG. 8. Note that, since an internal configuration of the imaging device 200 is similar to that of a first embodiment, a description thereof will be omitted.

The imaging device 200 has a configuration having a substantially rectangular parallelepiped shape that is flat and horizontally long. Configurations of a housing 110, a camera lens 120, a monitor 130, a shutter button 140, other various kinds of input devices such as a power source button to switch on/off power and a handler to perform zoom adjustment are similar to those in the first embodiment.

In the second embodiment, an input device 210 is provided on a rear surface of the imaging device 200. The input device 210 is formed as a slider at a lower portion of the rear surface of the housing 110. The input device 210 includes: a guide portion 220 extending in a direction same as a horizontal direction of the housing 110; and an operating piece 230.

The guide portion 220 is formed as a linear groove extending in a direction same as the horizontal direction of the housing 110. The operating piece 230 includes: a bar (not illustrated) entering the groove of the guide portion 220 and mechanically connected inside the imaging device 200; and a button provided at a tip of the bare user can slide the operating piece 230 along the guide portion 220 in L direction/R directions. The input device 210 outputs a horizontal position of the operating piece 230 to a control unit 11, and the control unit 11 performs control in accordance with the position. Such siding operation of the operating piece 230 corresponds to a first input unit 21.

In the present embodiment, as illustrated in FIG. 8B, a still image shooting mode and frame rates of moving image shooting are allocated along the position of the operating piece 230, and "S" indicating the still image shooting mode is printed on the housing 110 of the imaging device 200 and values each indicating a frame rate of moving image shooting are printed on the housing 110. A user can switch a shooting mode and a frame rate of the imaging device 200 by sliding the operating piece 230 in the L direction/R direction to place the operating piece 230 at a position corresponding to a desired shooting mode or a desired frame rate.

Additionally, as illustrated in FIG. 8C, the operating piece 230 is formed as a button that can be pressed in a Z direction (housing direction). When a user releases force to press the operating piece 230 in the Z direction, the operating piece 230 returns to an initial position. With this configuration, the input device 210 has an integral configuration functioning not only as the slider but also as the button.

Pressing in the Z direction of the operating piece 230 can be performed by two-step inputs including half pressing and deep pressing. This is similar to half pressing and deep pressing of a release button included in a general imaging device. Pressing in the Z direction of the operating piece 230 including the half pressing and the deep pressing corresponds to a second input unit 22.

In the present embodiment, a command for focusing can be input by half pressing of the second input unit 22, and a command for image acquisition (still image shooting) and moving image acquisition (moving image shooting) can be input by deep pressing of the second input unit 22.

Also, the operating piece 230 of the input device 210 has a configuration that can be pressed in a direction of an arrow Y (downward direction) in FIG. 8B when pressed by a user. When the user releases force to press the operating piece 230 in the Y direction, the operating piece 230 returns to the initial position. Such pressing in the Y direction corresponds to a third input unit 23. With this configuration, the input device has an integrated configuration functioning not only as the slider serving as the first input unit 21 and the button in the Z direction serving as the second input unit 22 but also as the button in the Y direction serving as the third input unit 23. Also, all of inputs are performed in different directions.

Since the first input unit 21 is to perform sliding operation, the second input unit 22 is to perform pressing the operating piece 230 in the Z direction, and the third input unit 23 is to perform pressing the operating piece 230 in the Y direction, a user can perform all of inputs with one finger (e.g., thumb or index finger). Consequently, it is possible to seamlessly switch a shooting mode and a frame rate of a moving image by a continuous input to the first input unit 21. Furthermore, it is possible to smoothly perform, without lifting up a finger from the input device 210 and without changing a holding way of the imaging device 200, a series of flow from switching a shooting mode and a moving image frame rate to providing a shooting command by the second input unit 22 or the third input unit 23.

Note that the position of the input device 210 is not limited to the lower portion of the rear surface of the housing 110 and may be an upper portion of the rear surface, may extend in a vertical direction, or may be provided on a side surface, an upper surface, or the like of the housing 110.

Furthermore, the input device 210 is not limited to a linear shape, and may have a substantially L-shape as illustrated in FIG. 8D. In the case of forming the input device 210 in the substantially L shape, it is preferable to arrange the "S" indicating the still image shooting mode at a corner of the L shape, arrange a frame rate having a highest value at a top on a side extending in a vertical direction, and arrange a frame rate having a lowest value at an end on a side extending in the horizontal direction, for example. With this arrangement, a shooting mode and a frame rate of moving image shooting can be intuitively switched.

Additionally, the input device 210 is not limited to have a mechanical slider structure including the guide portion 220 and the operating piece 230, and may include a touch panel. A user can make various kinds of inputs to the imaging device 200 by touching the touch panel with a finger.

The touch panel can detect each operation made on an operation surface, and can output coordinate data indicating a touched position. Additionally, the touch panel can detect each operation made on the operation surface, and can output data indicating a kind of the operation. Also, the touch panel can output a touched period on the operation surface.

With this configuration, the touch panel can detect, so to say, a tap input and a double tap input. The tap input is an input action in which a user touches the operation surface once for a short time with a finger or the like. The double tap input is an input action in which a user touches the operation surface consecutively twice at a short interval with a finger or the like.

For example, a shooting mode and a frame rate of moving image shooting can be designated by touching any position on the touch panel with a finger or the like using one of the above-described tap inputs. This corresponds to the first input unit 21. Note that a frame rate of moving image shooting can be seamlessly switched by sliding a finger on the touch panel.

Additionally, two-step inputs can be performed in accordance with a touched period of a finger or the like on the touch panel. This corresponds to half pressing and deep pressing in a general imaging device, and corresponds to the second input unit 22.

Additionally, the touch panel adopts a pressure-sensitive touch panel and may allow two-step inputs on the basis of pressing force to the touch panel with a user's finger or the like.

Even in a case where the input device 210 includes the touch panel as described above, it is possible to smoothly perform, without lifting up a finger from the input device 210 and without changing a holding way of the imaging device 200, a series of flow from selecting a shooting mode or a frame rate of a moving image to providing a shooting command.

The input device 210 according to the second embodiment has the above-described configuration. Note that state change of the imaging device 200 and control processing for an input to the input device 210 by a user are similar to those in the first embodiment.

According to the second embodiment, it is possible to easily switch a shooting mode and a frame rate of moving image shooting by a seamless continuous input, and also it is possible to easily perform a series of shooting operation from switching a shooting mode and a frame rate of moving image shooting to acquiring a still image and acquiring a moving image.

Meanwhile, the third input unit 23 may be formed separately from the input device 210 and may be provided at a position different from the input device 210 as described in the first embodiment with reference to FIG. 2D.

3. Third Embodiment

3-1. External Configuration of Imaging Device

Figure 9:
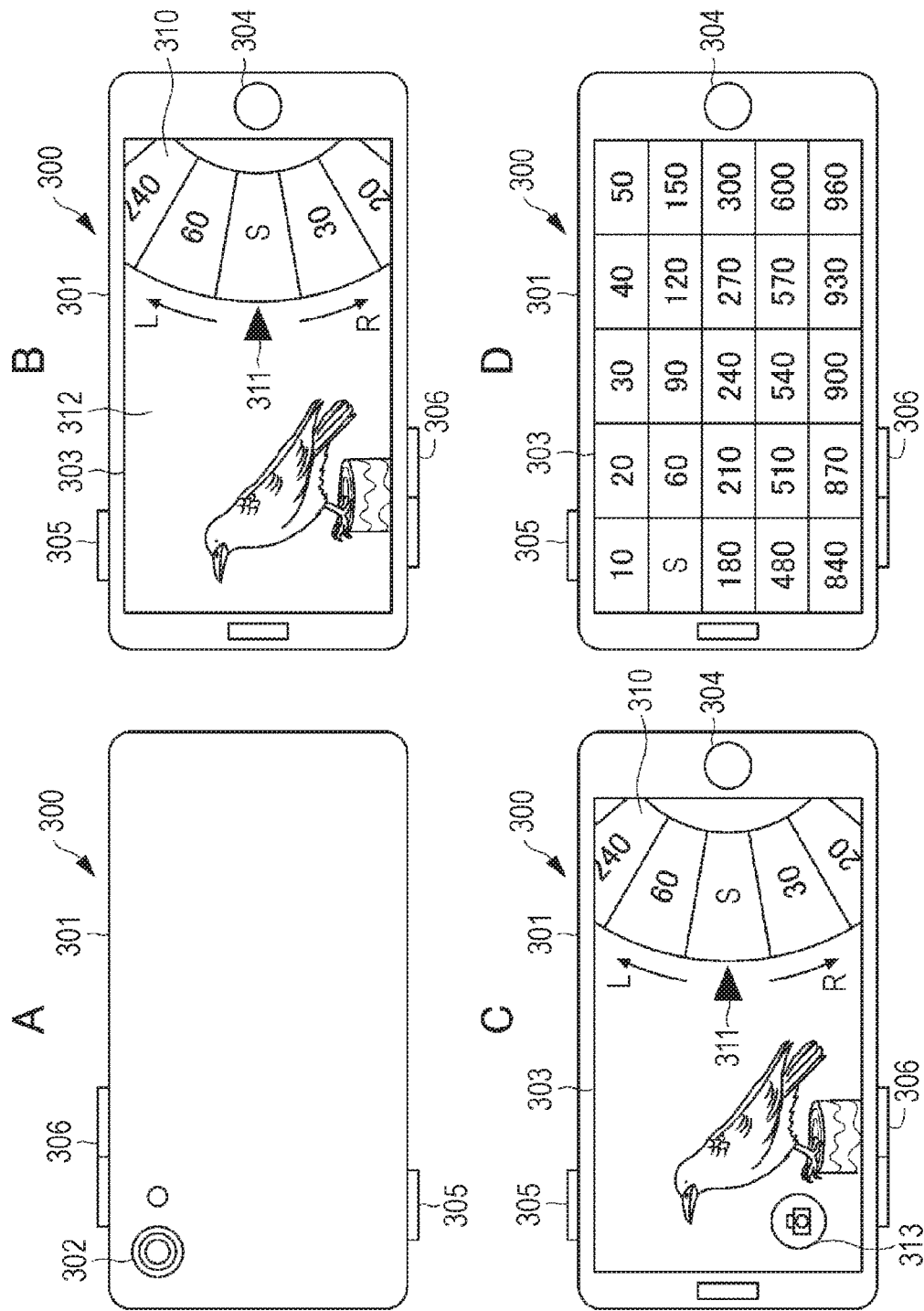
FIG. 9 provides views illustrating an external configuration of an imaging device according to a third embodiment.

Next, an external configuration of the imaging device 300 according to a third embodiment will be described with reference to FIG. 9. Note that, since an internal configuration of the imaging device 300 is similar to that of a first embodiment, a description thereof will be omitted.

In the third embodiment, the imaging device 300 is formed as a smartphone having a substantially rectangular parallelepiped shape that is flat and horizontally long.

A camera lens 302 is provided on a rear surface of a housing 301 of the imaging device 300. A user performs shooting with the camera lens 302 oriented toward a subject.

A display 303 is provided on a front surface of the imaging device 300. The display 303 corresponds to a display unit 20 in a block diagram of FIG. 1, and is a display means including an LCD, a PDP, an organic EL panel, or the like. On the display 303, a through images, an image obtained by imaging, an user interface image, and the like are displayed. The display 303 is formed as a touch screen integrated with a touch panel. With this configuration, a user can make various kinds of inputs to the imaging device 300 by touching the display 303 with a finger. As an inputting method, not only a tap input and a double tap input described above but also a drag operation and a flick operation can also be performed.

The drag operation is an input action in which a user's finger or the like is moved while the finger is kept touching an operation surface. The flick operation is an input action in which a user's finger or the like points out one point on the operation surface and then quickly flicks from the point in an arbitrary direction.

A home button 304 is provided on the front surface of the imaging device 300. The home button 304 is used to start up the imaging device 300 from a sleep state, change the screen to the home screen, and perform other various kinds of operation. The home button 304 may include a hardware button, a software button displayed on the display 303, or a touch panel.

Additionally, a power button 305 is provided on one side surface of the imaging device 300. Furthermore, a volume control button 306 to adjust volume is provided on the other side surface of the imaging device 300.

As illustrated in FIG. 9B, a dial-like operation icon 310 is displayed on the display 303. The operation icon 310 is partitioned at equal intervals, and "S" indicating still image shooting and frame rates of moving image shooting are allocated in respective partitioned areas. The operation icon 310 is used to provide a command to switch a shooting mode and switch a frame rate of moving image shooting. Additionally, an arrow icon 311 to point to a current shooting mode or a current frame rate of moving image shooting is displayed on the display 303. As illustrated in 9B, the operation icon 310 and the arrow icon 311 may be displayed in a manner superimposed on a monitoring image, or may be displayed in a manner switched from the monitoring image in accordance with an input from a user.

As illustrated in FIG. 9B, the operation icon 310 has a configuration that is rotated in an L direction or an R direction in accordance with the drag operation or the flick operation from a user so as to change a display. A user can switch a shooting mode and a frame rate of moving image shooting by adjusting a desired shooting mode or a desired frame rate to the portion pointed by the arrow icon 311. Consequently, a user can seamlessly switch a shooting mode and a frame rate of moving image shooting by a continuous input. Such an input to the operation icon 310 corresponds to a first input unit 21.

Additionally, an input to an entire region other than the operation icon 310 of the display 303 (hereinafter referred to as an extra icon area 312) functions as a second input unit 22. A user makes a tap input or a double tap to the extra-icon area 312 with a finger or the like, thereby enabling two-step inputs corresponding to half pressing and deep pressing. Consequently, the touch screen of the display 303 has an integrated configuration functioning not only as the operation icon 310 but also as a button. Also, each kind of input operation is performed in a different direction.

Meanwhile, the second input unit 22 may not be set to the entire region of the extra-icon area 312, and a software button 313 is provided somewhere in the extra-icon area 312 as illustrated in FIG. 9C and two-level inputs can be performed with to this software button 313.

Additionally, besides the tap input and the double tap input, two-step inputs can be performed by utilizing a touched period, a touched area size, a touched pressure, and the like of a finger or the like on the extra-icon area 312.

Furthermore, a function as a third input unit 23 is assigned to the hardware buttons such as the home button 304, power button 305, and volume control button 306 or any position in the extra-icon area 312 of the display 303. With this configuration, the imaging device 300 is provided with: an input to the operation icon 310 serving as the first input unit 21; an input to the extra-icon area 312 serving as the second input unit 22; and an input to the hardware buttons or the extra-icon area 312 serving as the third input unit 23.

Furthermore, operability can be improved by arranging the operation icon 310 on the home button 304 side, and assigning the function of the second input unit 22 or third input unit 23 to the home button 304 such that all kinds of operation can be performed within a narrow range.

With the above-described configuration, a user can perform all kinds of inputs with one finger. Consequently, it is possible to seamlessly switch a shooting mode and a frame rate of a moving image by a continuous input to the first input unit 21. Furthermore, it is possible to smoothly perform, without lifting up a finger from the input device 210 and without changing a holding way of the imaging device

300, a series of flow from switching a shooting mode and a frame rate of a moving image to providing a shooting command by the second input unit 22 or the third input unit 23.

Meanwhile, a frame rate may also be switched by every 1 fps by allotting frame rates from 1 fps to 960 fps in the respective partitioned areas of the dial-like operation icon 310 per 1 fps.

Meanwhile, the first input unit 21 formed by being displayed on the display 303 is not limited to the above-described dial-like operation icon 310, and may also be formed in a grid pattern obtained by dividing the display 303 at equal intervals as illustrated in FIG. 9D.

In a case where the first input unit 21 is formed in the grid pattern, "S" indicating the still image shooting mode and values indicating frame rates of moving image shooting can be arbitrarily set. For example, as illustrated in FIG. 9D, the "S" indicating the still image shooting mode is arranged in one cell, and the frame rates are sequentially arranged in other cells.

The frame rates may be arranged while setting, as a reference, for example, 60 fps that is generally assumed to be able to reproduce a smooth image and used in shooting a normal moving image, and an interval between frame rates may be set differently between a range 60 fps or more and a range of 60 fps or less. This can prevent the number of cells from becoming enormous, prevent the display from being hardly viewable, and prevent operation from becoming difficult. Additionally, a size and the number of cells may be arbitrarily set by a user.

Meanwhile, in the case of having the grid pattern illustrated in FIG. 9D, the cells may also be displayed in a manner superimposed on a monitoring image, or may be displayed in a manner switched from the monitoring image in accordance with an input from a user.

The third embodiment has the configuration as described above. Note that state change of the imaging device 300 and control processing for an input from a user are similar to those in the first embodiment.

According to the third embodiment, it is possible to easily switch a shooting mode and a frame rate of moving image shooting by a seamless continuous input, and also it is also possible to easily perform a series of shooting operation from switching a shooting mode and a frame rate of moving image shooting to acquiring a still image and acquiring a moving image.

In the related art, shooting with variable frame rates is mainly limited to a person who has experience in using professional equipment, but using the present technology, any person can easily switch a frame rate and perform moving image shooting. Since the frame rate is switched by an input to the first input unit 21 and a shooting command is made by an input to the second input unit 22, it is possible to intuitively switch a shooting mode, switch a frame rate, and perform shooting. Therefore, even a user without having experience in using professional equipment is quickly get accustomed and can shoot a desired moving image which could not be shot until now. Furthermore, for a user who has experience in shooting with variable frame rates with the professional equipment, shooting becomes easier because of better operability, and shooting variety can be broaden.

4. Modified Examples

While the embodiments of the present technology are specifically described, the present technology is not limited to the above-described embodiments, and various kinds of modifications can be made based on the technical idea of the present technology.

Figure 10:
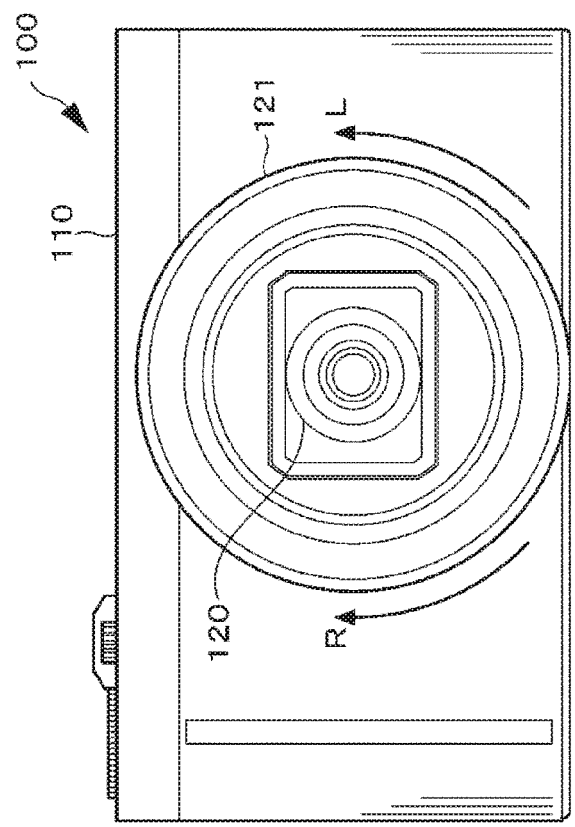
FIG. 10 is a diagram illustrating a modified example of the imaging device.

As illustrated in FIG. 10, the first input unit 21 may be assigned to rotational operation of a ring 121 of a camera lens 120 included in the imaging device 100. In this case, an initial position of the ring 121 may be set at still image shooting, switching to a lower frame rate may be performed by rotating the ring to one side (e.g., L direction) and switching to a higher frame rate may be performed by rotating the ring to the other side (R direction). Note that the L direction and the R direction in FIG. 10 are opposite to those in FIG. 2 because the ring 121 of the camera lens 120 is provided on a front surface side of the camera.

Additionally, in the first and second embodiments, the function of the third input unit 23 may be assigned to the shutter button 140 preliminarily included in each of the imaging devices 100 and 200. Since the third input unit 23 is used in a moving image shooting standby state or still image shooting during moving image shooting, a user can intuitively shoot a still image by assigning the function to the shutter button 140.

Also, in the smartphone corresponding to the specific example of the third embodiment, there is the hardware button such as the volume control button 306 functioning as a shutter button of a camera application. In this case, the function of the third input unit 23 may be assigned to the hardware button functioning as the shutter button.

In all of the first to third embodiments, an input to the first input unit 21 may not necessarily be accepted during moving image shooting. For example, it is effective in a case of not desiring to change a frame rate during moving image shooting.

Described in the first and second embodiments is the example of a digital camera, and described in the third embodiment is the example of a smartphone, but any of the embodiments is not limited to such specific devices. The first and second embodiments can be applied to a smartphone, and the third embodiment may be applied to a digital camera.

Additionally, the present technology is applicable to any device having a camera function, such as a single-lens reflex camera, a digital video camera, a network camera, an in-vehicle camera, a monitoring camera, a notebook computer, a tablet terminal, a portable game machine, a wrist-watch type wearable terminal, and an eyeglass type wearable terminal.

Also, the present technology is applicable to a so-called multi camera system capable of performing simultaneous scooting with a plurality of apparatuses by connecting a plurality of digital cameras, digital video cameras, smartphones, and the like via a WiFi network or the like. For example, in a case of setting a shooting mode and a frame rate by utilizing the present technology in a main camera with which a user performs shutter operation or the like, the setting is transmitted to another sub camera via the WiFi network or the like and the same setting is applied in this sub camera.

Note that the present technology may also adopt the following configurations.

(1)

An imaging device including a control unit adapted to perform setting for shooting in accordance with an input from a first input unit in which setting for a still image shooting mode and a plurality of frame rates at the time of moving image shooting can be continuously input.

(2)

The imaging device recited in (1), in which a continuous input can be made to the first input unit sequentially from a first frame rate to the still image shooting mode, and then to a second frame rate having a value lower than the first frame rate.

(3)

The imaging device recited in (1), in which a continuous input can be made to the first input unit sequentially from a first frame rate to a second frame rate having a value lower than the first frame rate, and then to the still image shooting mode.

(4)

The imaging device recited in (1), in which a continuous input can be made to the first input unit sequentially from a first frame rate to a second frame rate having a value lower than the first frame rate, to the still image shooting mode, and then to a third frame rate having a value lower than the second frame rate.

(5)

The imaging device recited in (1), in which a continuous input can be made to the first input unit sequentially from a first frame rate to the still image shooting mode, to a second frame rate having a value lower than the first frame rate, and then to a third frame rate having a value lower than the second frame rate.

(6)

The imaging device recited in (1), in which a continuous input can be made to the first input unit sequentially from a first frame rate to the still image shooting mode, to a second frame rate having a value lower than the first frame rate, then to a third frame rate having a value higher than the first frame rate, and further to the first frame rate.

(7)

The imaging device recited in any one of (1) to (6), in which the still image shooting mode can be further set a plurality of times in the first input unit at time of inputting a series of a continuous input from the first frame rate to the first frame rate.

(8)

The imaging device recited in any one of (1) to (7), in which setting for the still image shooting mode and the plurality of frame rates at the time of moving image shooting can be continuously input in the first input unit by performing inputting in two or more different directions.

(9)

The imaging device recited in any one of (1) to (8), further including a second input unit adapted to receive a command for the still image shooting and a command for the moving image shooting from the user.

(10)

The imaging device recited in (9), in which the second input unit is integrally formed with the first input unit.

(11)

The imaging device recited in (9) or (10), in which an input to the second input unit is an input in a direction different from an input to the first input unit.

(12)

The imaging device recited in any one of (9) to (11), in which the second input unit can receive two kinds of inputs.

(13)

The imaging device recited in any one of (1) to (12), in which in a case where the first input unit receives a command to select the frame rate during operation is the still image shooting mode, the control unit changes the still image shooting mode to the moving image shooting mode.

(14)

The imaging device according to claim 1, in which the control unit switches a frame rate in a case where a command to switch the frame rate is input to the first input unit during the moving image shooting.

(15)

The imaging device recited in any one of (1) to (14), is which the first input unit is formed as a dial that can be rotationally operated.

(16)

The imaging device recited in (15), further including a second input unit integrally formed with the first input unit and formed as a switch that can be pressed.

(17)

The imaging device recited in any one of (1) to (14), in which the first input unit is formed as a slider in which an operating piece slides in a predetermined direction.

(18)

The imaging device recited in any one of (1) to (14), in which the first input unit includes a touch panel.

(19)

An imaging method including performing setting for shooting in accordance with an input from a first input unit in which setting for a still image shooting mode and a plurality of frame rates at the time of moving image shooting can be continuously input.

(20)

An imaging program causing a computer to execute an imaging method including performing setting for shooting in accordance with an input from a first input unit in which setting for a still image shooting mode and a plurality of frame rates at the time of moving image shooting can be continuously input.

REFERENCE SIGNS LIST

11 Control unit
21 First input unit
22 Second input unit
23 Third input unit
100, 200, 300 Imaging device
230 Operating piece

The invention claimed is:

1. An imaging device comprising:
  a first input unit configured to output a continuous input; and
  a control unit configured to
    receive the continuous input; and
    perform one setting for shooting from a plurality of settings in accordance with the continuous input that is received,
  wherein the plurality of settings includes a first setting for a still image shooting mode, a second setting for determining a first frame rate as a single frame rate at a time of only a moving image shooting, and a third setting for determining a second frame rate as the single frame rate at the time of only the moving image shooting, and
  wherein the first frame rate is different from the second frame rate.

2. The imaging device according to claim 1, wherein the continuous input changes sequentially from the first frame rate to the still image shooting mode, and then to the second frame rate having a value lower than the first frame rate.

3. The imaging device according to claim 1, wherein the continuous input changes sequentially from the first frame rate to the second frame rate having a value lower than the first frame rate, and then to the still image shooting mode.

4. The imaging device according to claim 1, wherein the continuous input changes sequentially from the first frame rate to the second frame rate having a value lower than the first frame rate, to the still image shooting mode, and then to a third frame rate having a value lower than the second frame rate.

5. The imaging device according to claim 1, wherein the continuous input changes sequentially from the first frame rate to the still image shooting mode, to the second frame rate having a value lower than the first frame rate, and then to a third frame rate having a value lower than the second frame rate.

6. The imaging device according to claim 1, wherein the continuous input changes sequentially from the first frame rate to the still image shooting mode, to the second frame rate having a value lower than the first frame rate, then to a third frame rate having a value higher than the first frame rate, and further to the first frame rate.

7. The imaging device according to claim 6, wherein the setting for the still image shooting mode is a first setting for the still image shooting mode, and the plurality of settings further includes a second setting for the still image shooting mode.

8. The imaging device according to claim 1, wherein the first input unit is a dial that is configured to output the continuous input by rotating in opposite directions.

9. The imaging device according to claim 1, further comprising a second input unit configured to
    output a first input indicative of a command for still image shooting, and
    output a second input indicative of a command for the moving image shooting.

10. The imaging device according to claim 9, wherein the second input unit is integrally formed with the first input unit.

11. The imaging device according to claim 10, wherein the first input and the second input are inputs in a direction different from the continuous input.

12. The imaging device according to claim 9, wherein the first input is a first type of input, and wherein the second input is a second type of input that is different from the first type of input.

13. The imaging device according to claim 1, wherein the continuous input is indicative of a frame rate during operation in the still image shooting mode, the control unit is further configured to change from the still image shooting mode to the moving image shooting mode.

14. The imaging device according to claim 1, wherein the continuous input is indicative of a command to switch a frame rate during the moving image shooting, the control unit is further configured to switch from the first frame rate to the second frame rate.

15. The imaging device according to claim 10, wherein the second input unit is a switch that is configured to receive a depressive force from a user.

16. The imaging device according to claim 1, wherein the first input unit is formed as a slider in which an operating piece slides in a predetermined direction.

17. The imaging device according to claim 1, wherein the first input unit includes a touch panel.

18. An imaging method comprising:
    outputting, with a first input unit, a continuous input;
    receiving, with a control unit, the continuous input; and
    performing, with the control unit, one setting for shooting from a plurality of settings in accordance with the continuous input that is received,
    wherein the plurality of settings includes a first setting for a still image shooting mode, a second setting for determining a first frame rate as a single frame rate at a time of only a moving image shooting, and a third setting for determining a second frame rate as the single frame rate at the time of only the moving image shooting, and
    wherein the first frame rate is different from the second frame rate.

19. A non-transitory computer-readable medium comprising an imaging program that, when executed by an electronic processor, causes the electronic processor to perform a set of operations comprising:
    receiving a continuous input from a first input unit; and
    performing one setting for shooting from a plurality of settings in accordance with the continuous input that is received,
    wherein the plurality of settings includes a first setting for a still image shooting mode, a second setting for determining a first frame rate as a single frame rate at a time of only a moving image shooting, and a third setting for determining a second frame rate as the single frame rate at the time of only the moving image shooting, and
    wherein the first frame rate is different from the second frame rate.

20. The imaging method according to claim 18, further comprising:
    outputting, with a second input unit, a first input indicative of a command for still image shooting; and
    outputting, with the second input unit, a second input indicative of a command for the moving image shooting.

* * * * *